United States Patent Office 3,497,463
Patented Feb. 24, 1970

3,497,463
POLYMERIZATION OF ALKYLENE OXIDES WITH CATALYST SYSTEM COMPRISING A HINDERED AMINE
Arthur E. Gurgiolo, Lake Jackson, Tex., assignor to The Dow Chemical Company, Midland, Mich., a corporation of Delaware
No Drawing. Filed Oct. 28, 1963, Ser. No. 319,571
Int. Cl. C08g 23/14, 23/10
U.S. Cl. 260—2                               6 Claims This invention relates to improved processes for the polymerization of mono-oxirane compounds, hereinafter referred to generically as alkylene oxides. By this term is meant the common olefin oxides such as ethylene oxide, propylene oxide, 1,2-butylene oxide, butadiene monoxide, epichlorohydrin, epibromohydrin, styrene oxide and cyclohexene oxide; the oxides of the alkyl vinyl ethers, such as 2-methoxyethylene oxide and 2-butoxyethylene oxide; monoglycidyl ethers and esters, and the like, and mixtures of the foregoing. In general, the polymerization of any alkylene oxide that is polymerizable with a Group II or Group III metal catalyst, such as a metal alkyl or metal alkoxide catalyst is improved by use of the present invention. Suitable such oxides and catalysts are disclosed in U.S. Patents, 2,706,181; 2,706,182; 2,-844,545; 2,861,962; 2,873,258 and 3,016,394 and in British Patents 785,053; 785,229; 893,274 and 870,418.

According to the present invention, the polymerization of alkylene oxides is improved and products having higher molecular weights and superior properties are produced when the oxide is polymerized by use of a Group II or Group III (of the Periodic Table) metal catalyst if the polymerization is conducted in the presence of a small proportion of a sterically hindered amine or phenol.

By "sterically hindered" amines and phenols is meant those in which the reactivity of the amino or phenolic hydroxyl group, respectively, is significantly reduced by the presence of one or more large substituent groups on the molecule near such amino or hydroxyl group. Such steric hindrance is typically produced by one or more aryl, halogen or alkyl groups on adjacent carbon atoms. In the aromatic compounds, any substituent on both of the adjacent carbon atoms is sufficient to produce hindrance, even if both are methyl groups. Typical hindered phenols include o-t.-butylphenol, 2,6-diisopropylphenol, 2,6-di-t.-butyl-p-cresol, 6-butyl-o-cresol, o-t.-amylphenol, 2,6-diisobutylphenol, o-chlorophenol, o-bromophenol, o-chloro-p-cresol, 2,6-dichlorophenol, 2,4-dibromophenol, 2,6-dimethylphenol, o-phenylphenol, o-phenyl-p-cresol, β-phenyl-α-naphthol, 3-t.-butyl-p,p'-biphenol, 3,3'-di-t.-butyl-o,o'-biphenol, 3,3',5,5'-tetramethyl-o,o-biphenol, 3,3'-dichloro-4,4'-isopropylidenediphenol, 3,3',5,5' - tetramethyl-4,4'-methylenediphenol and 3,3'-diisopropyl-2,2'-oxydiphenol.

Typical hindered amines include the amino analogs of the above phenols as well as diphenylamine, N-phenylnaphthylamines, N-sec.-butylaniline, diisobutylamine, di-t.-amylamine, phenothiazine, 2,6-diphenylaniline, 2,6-di-t.-octylaniline, N-isobutyl-2-aminodiphenyl, and the like. In general, those skilled in the art are well aware of which amines and phenols are significantly hindered and of routine tests for hindrance in such compounds.

The following examples illustrate the practice of the invention.

EXAMPLES 1–4

A. Preparation of catalyst

An oxypropylated ferric chloride catalyst was prepared essentially as described in U.S. Patent 2,873,258, as follows:

To a 35-gallon vessel equipped with a means for agitating and controlling the temperature was added 140 pounds of carbon tetrachloride, then 14.3 pounds of anhydrous ferric chloride was added under anhydrous conditions and the kettle was sealed. Then 20.5 pounds of propylene oxide was added over a 2-hour period while agitating and maintaining the temperature at a maximum of 50° C. for 2 hours. The contents of the vessel were then digested for 30 minutes at 50° C. and then cooled to 35° C. after which 64 pounds of hexane was added. The temperature was then raised to 48° C. and a mixture of 18.2 pounds of propylene oxide and 2.38 pounds of water was added over a 2-hour period. The mixture was digested for 30 minutes. The contents were filtered and the solid catalyst was washed twice with propylene oxide, dried, and stored. The catalyst analysis was 32.1% Fe, 8.4% total Cl, 2.6% inorganic Cl.

B. Polymerization procedure

Into a citrate bottle were charged 100 g. of epichlorohydrin, 4 g. (4%) of the above iron catalyst and a phenol or amine additive. After flushing the reactor with nitrogen and heating at 80° C. for 62 hours, a brown solid polymer was obtained. The unreacted epichlorohydrin was removed by placing the chopped crude polymer in a vacuum oven. The crude polymer was purified by dissolving 25 g. in 200 milliliters of hot dioxane. Then 5 milliliters of concentrated HCl was stirred into the polymer solution to dissolve the catalyst. This solution was then poured into 800 cc. of methanol to precipitate the solid polymer. The polymer was filtered, washed with methanol and dried. The molecular weights of the purified white polymer are given in Table I. The amine or phenol is shown as percent by weight based on alkylene oxide. In each experiment the conversion of monomer to polymer was about 40–47%, of which polymer about 45–55% was recovered as purified solid. Molecular weights were estimated from viscosity measurements in dioxane.

In this first series of experiments, the additive was 2,6-di-t.-butyl-p-cresol (sold commercially under the trade name Ionol).

TABLE I

| Example | Percent Ionol | Mol. wt. of purified polymer |
| --- | --- | --- |
| 1 | [1] 0 | 270,000 |
| 2 | 0.5 | 380,000 |
| 3 | 1.0 | 350,000 |
| 4 | 5.0 | 355,000 |

[1] Control.

EXAMPLE 5–15

In a second series of experiments, various hindered amines and phenols were used in experiments otherwise similar to Examples 1–4. The polymerizations were terminated after 48 hours rather than 62 hours. Results are shown in the following table. The recorded increase in molecular weight of the polymer is the percentage increase over that of the polymer produced in a control experiment in which no additive was used.

TABLE II

| Example | Additive, percent | Percent increase in mol. wt. of polymer |
|---|---|---|
| 5 | Ionol, 0.5 | 74 |
| 6 | o-t.-Butylphenol, 0.5 | 17 |
| 7 | o-t.-Butyl-o-cresol, 0.5 | 59 |
| 8 | 2,6-diisopropylphenol, 0.5 | 45 |
| 9 | 3,3',5,5'-tetra-t.-Butyl-o,o'-diphenol, 0.5 | 70 |
| 10 | 3,3',5,5'-tetra-t.-butyl-o,o'-diphenol, 0.1 | 11 |
| 11 | 3,3',5,5'-tetra-t.-amyl-o,o'-diphenol, 0.5 | 41 |
| 12 | 3,3'-di-t.-butyl-5,5'-dimethyl-o,o'-diphenol, 0.5 | 44 |
| 13 | 3,3'-5,5'-tetramethyl-o,o'-diphenol, 0.5 | 26 |
| 14 | 2,2',6,6'-tetramethyl-p,p'-diphenol, 0.5 | 42 |
| 15 | Phenothiazine, 1.0 | 67 |

EXAMPLES 16-26

In this series of experiments, various alkylene oxides were polymerized under comparable conditions with and without an additive in accord with the invention, the general procedure being similar to that used in the above examples except as noted. The solid polymers thus produced were purified and characterized as to molecular weight by determination of the reduced viscosity of a 0.5% solution in dioxane containing 0.25 cc. of concentrated hydrochloric acid per 100 cc. The measurements were made at 30° C. in an Ostwald Viscometer.

Table III shows the results as percentage increase in reduced viscosity, based on the control wherein no additive was used. Percentages of oxide, catalyst and additive are by weight.

TABLE III

| Ex. | Alkylene oxide | Catalyst, percent | Additive, percent | Increase in reduced viscosity, percent |
|---|---|---|---|---|
| 16 | Propylene oxide | FeCl$_3$,[1] 4.0 | Dihexylamine, 0.5 | 83 |
| 17 | 1,2-butylene oxide | FeCl$_3$,[1] 6.0 | Ionol, 2.0 | 17 |
| 18 | Propylene oxide 94 wt. percent, allyl glycidyl ether 6 wt. percent | FeCl$_3$,[1] 4.0 | Ionol, 0.5 | 41 |
| 19 | do | FeCl$_3$,[1] 4.0 | Phenothiazine, 1.0 | 230 |
| 20 | do | FeCl$_3$,[1] 4.0 | Phenothiazine, 2.0 | 59 |
| 21 | do | FeCl$_3$,[1] 4.0 | Diphenylamine, 1.0 | 29 |
| 22 | do | FeCl$_3$,[1] 4.0 | Diisopropylamine, 2.0 | 30 |
| 23 | Propylene oxide 97 vol. percent, allyl glycidyl ether 3 vol. percent | Diethyl zinc, 3.0 | Ionol, 0.6 | 71 |
| 24 | do | Triethyl Al,[2] 1.0 | Ionol, 0.1 | 25 |
| 25 | do | do [2] | Ionol, 0.5 | 103 |
| 26 | do | do [2] | Ionol, 1.0 | 36 |

[1] A partially hydrolyzed oxypropylated ferric chloride catalyst prepared as described above. Percentages are by weight, based on alkylene oxide.
[2] A partially hydrolyzed triethyl aluminum catalyst made by mixing 15 vol. of a 20% by wt. hexane solution of Al (C$_2$H$_5$)$_3$ and 1.37 vol. of 2,4-pentanedione and then adding 1.11 vol. of a 10% by wt. solution of water in dioxane. Percentages of catalyst are based on aluminum alkyl and alkylene oxide.

Polymers produced according to the present invention, being of much higher molecular weight than those produced in the absence of the additives of the invention, are especially useful in making vulcanized elastomers. This is illustrated by the following examples.

Copolymers prepared in the manner of Examples 24 and 25 were compounded and vulcanized using the following recipe and technique:

| | Parts by wt. |
|---|---|
| Copolymer | 100.0 |
| Phenyl-B-naphthylamine | 2.0 |
| Stearic acid | 2.0 |
| Zinc oxide | 5.0 |
| United 65 SPF black | 45.0 |
| Sulfur 30-1 | 3.0 |
| Methyl tuads | 2.0 |
| Captax | 2.0 |

These ingredients were compounded into the copolymer on a roll mill using the following technique: Tap water was run through the mill rolls to keep them cool. The copolymer was banded on the mill. The the phenyl-B-naphthylamine, stearic acid, and zinc oxide were added at the same time. The carbon black was added next. Lastly, the sulfur, methyl tuads, and captax were added at the same time. After everything was added, the mixture was milled an additional five minutes with frequent cutting with the mill knife to insure thorough mixing. Then the mixture was removed from the mill.

Vulcanization was accomplished by the following technique: Three 24-gram samples were cut from the above-compounded stock. They were cured in a 320° F. press at about 30,000 pound ram force for 40 minutes. The curing was done in a 4 x 5 x 0.065 inch metal mold.

Physical properties of the vulcanized copolymers are reported in Table IV.

TABLE IV

| Polymer of Example No. | Wt. percent Ionol used in polymerization | Reduced viscosity of polymer | Properties of vulcanizate | | |
|---|---|---|---|---|---|
| | | | Tensile Str., p.s.i. | Elongation, percent | Shore A hardness |
| Control | 0 | 1.024 | 1,750 | 820 | 68 |
| 24 | 0.1 | 1.280 | 2,150 | 915 | 69 |
| 25 | 0.5 | 2.080 | 2,760 | 800 | 72 |

I claim:
1. In the process wherein an olefin oxide is polymerized by the action of a catalyst comprising an iron salt, an iron alkyl or an iron alkoxide, the improvement of producing polymers of enhanced molecular weight by conducting the polymerization in the presence of a hindered amine.

2. The process of claim 1 wherein the amine is diphenylamine, N-phenylnaphthylamine, N-sec.-butylaniline, diisobutylamine, di-t.-amylamine, phenothiazine, 2,6-diphenilaniline, 2,6-di-t.-octylaniline, N-isobutyl-2-aminodiphenyl, dihexylamine, or diisopropylamine.

3. The process of claim 2 wherein the amine in phenothiazine.

4. The process of claim 2 wherein the amine is diphenylamine.

5. The process of claim 2 wherein the amine is diisopropylamine.

6. The process of claim 2 wherein the amine is dihexylamine.

References Cited

UNITED STATES PATENTS

| 2,706,189 | 4/1955 | Pruitt et al. |
| 2,870,100 | 1/1959 | Stewart et al. |
| 2,873,258 | 2/1959 | Borkovec. |
| 3,398,119 | 8/1968 | Garty et al. |
| 3,284,374 | 11/1966 | Daimon et al. |

WILLIAM H. SHORT, Primary Examiner

T. PERTILLA, Assistant Examiner

U.S. Cl. X.R.

260—88.3